United States Patent
Hudert

(10) Patent No.: US 8,678,664 B2
(45) Date of Patent: Mar. 25, 2014

(54) ROLLER BEARING ASSEMBLY

(75) Inventor: Fabian Hudert, Schweinfurt (DE)

(73) Assignee: Aktiebolaget SKF, Gothenburg (SE)

( * ) Notice: Subject to any disclaimer, the term of this patent is extended or adjusted under 35 U.S.C. 154(b) by 156 days.

(21) Appl. No.: 12/962,005

(22) Filed: Dec. 7, 2010

(65) Prior Publication Data

US 2011/0142704 A1 Jun. 16, 2011

(30) Foreign Application Priority Data

Dec. 15, 2009 (DE) .................. 10 2009 058 354

(51) Int. Cl.
*F16C 43/04* (2006.01)
*F16C 23/10* (2006.01)
*F16C 27/00* (2006.01)

(52) U.S. Cl.
USPC ............................ 384/556; 384/99; 384/563

(58) Field of Classification Search
USPC .......... 384/57, 192, 229, 252, 258, 448, 563, 384/99, 556; 74/89.23, 424.71
See application file for complete search history.

(56) References Cited

U.S. PATENT DOCUMENTS

| | | | |
|---|---|---|---|
| 2,971,704 A | | 2/1961 | Asplund |
| 3,212,721 A | | 10/1965 | Asplund et al. |
| 3,737,109 A | | 6/1973 | Johansson |
| 4,073,442 A | | 2/1978 | Virving |
| 4,626,111 A | * | 12/1986 | Swasey et al. .................. 384/99 |
| 4,989,436 A | * | 2/1991 | Setzer et al. ..................... 72/247 |
| 5,743,016 A | * | 4/1998 | Manne et al. ............. 29/898.062 |
| 5,857,783 A | * | 1/1999 | Johansson et al. ............. 384/556 |
| 5,966,988 A | * | 10/1999 | Aiso et al. ..................... 74/89.34 |
| 2008/0187265 A1 | * | 8/2008 | Koda et al. ..................... 384/563 |
| 2010/0181854 A1 | | 7/2010 | Breucker et al. |
| 2011/0020088 A1 | * | 1/2011 | Nakashima et al. .......... 409/231 |

FOREIGN PATENT DOCUMENTS

| | | |
|---|---|---|
| AT | 245348 B | 2/1966 |
| DE | 589119 C | 12/1933 |
| DE | 675772 C | 5/1939 |
| DE | 2151361 A1 | 5/1972 |
| DE | 29805351 U1 | 6/1998 |
| DE | 102008038978 A1 | 4/2009 |
| EP | 0867628 A2 | 9/1998 |
| EP | 867628 A2 * | 9/1998 ............. F16C 39/06 |
| EP | 2085626 A1 * | 8/2009 |

OTHER PUBLICATIONS

FAG Hydraulic Nut, Schaeffler Technologies GmbH & Co. KG, May 2010, pp. 1-28.

* cited by examiner

*Primary Examiner* — Alan B Waits
(74) *Attorney, Agent, or Firm* — Bryan Peckjian; SKF USA Inc. Patent Department

(57) ABSTRACT

A roller bearing assembly is configured to rotatably support a machine component connected with a shaft in a position relative to a reference component. The roller bearing assembly includes a radial bearing, an axially-displaceable axial bearing and an adjusting device configured to adjust an axial gap between the machine component and the reference component by automated axial displacement of the axial bearing. The adjusting device includes a hydraulic regulating device configured to axially displace the axial bearing.

21 Claims, 2 Drawing Sheets

ROLLER BEARING ASSEMBLY

CROSS-REFERENCE

This application claims priority to German patent application no. 10 2009 058 354.8 filed on Dec. 15, 2009, the contents of which are incorporated fully herein by reference.

TECHNICAL FIELD

The present invention generally relates to a roller bearing assembly configured to rotatably support a machine part connected with a shaft.

BACKGROUND ART

In certain machines, it may be necessary to adjust a machine component, which is rotatably supported by a shaft in a housing, by a certain amount in the axial direction. For example, it may be necessary to adjust a front or end side of the machine component relative to a housing wall so as to maintain a certain axial clearance therebetween during operation.

In rotary screw-type machines, e.g., in rotary screw compressors, the size of the axial clearance between the screw and the housing affects the sealing and thus the efficiency of the compressor machine. Therefore, it is desirable, especially in these cases, to achieve a gap as small as possible, e.g., which is close to zero. However, there should never be any abrasive contact between rotating and stationary machine components.

Generally speaking, relatively-rigid roller bearing assemblies are utilized for setting relatively small axial clearances, and a defined axial gap is set during the installation of the roller bearing assembly, e.g., by placing spacer rings underneath or by displacing adjusting threads on the shaft. However, it is disadvantageous that the adjustment during the assembly is manually complex.

In addition, influences that affect the axial gap width during the operation of the machine, such as thermal expansions of machine components, may not be addressed. Therefore, while performing the manual assembly adjustment using spacers or adjusting threads, it is necessary to consider, already during the assembly step, the amount that the gap width may change during operation due to temperature changes. Generally speaking, an undesirably large clearance must often be accepted in order to avoid the risk of having a relatively small gap decrease during operation to the point that the rotating machine component abrasively contacts a stationary component, e.g., due to differing thermal coefficients of expansions of the rotating and stationary components when the machine subsequently heats up.

DE 298 05 351 U1 and its English-language counterpart EP 0 867 628 A2 describes a bearing assembly for a rotatable shaft that supports a means for performing work during rotation of the shaft. The shaft is supported radially by at least one radial bearing that permits movement of the shaft in the axial direction and has a means for supporting the shaft in the axial direction. The means supporting the shaft in the axial direction is an element fixedly attached to the shaft for rotation therewith. This element is arranged so as to be influenced by electromagnetic forces emanating from a stationary position under influence of a control device acting upon sensor means. The instantaneous axial position of the shaft is detectable by the sensor means for precise axial positioning of the shaft and continuous axial adjustment to effect any position changes required for optimizing the work performed by the means supported by the shaft.

SUMMARY

In one aspect of the present teachings, a roller bearing assembly is disclosed that can controllably and reliably maintain a clearance or axial gap between a rotating machine component and a housing of a machine, in particular during the operation of the machine.

In another aspect of the present teachings, a roller bearing assembly is disclosed for rotatably supporting a machine component, which connected with a shaft, in a position relative to a reference component. The roller bearing assembly includes a radial bearing, a positionable axial bearing and an adjusting device for adjusting an axial gap between the machine component and the reference component by automated displacement of the positionable axial bearing. The adjusting device includes a hydraulic regulating device for positioning the axial bearing.

Such a design may exhibit one or more of the following advantages. Rapidly-occurring interference fluctuations, which may occur during disturbances of the magnetic field of a magnetic bearing, can be compensated better or more reliably by a hydraulic regulating device. In addition or in the alternative, larger actuating forces can be applied by the hydraulic regulating device to the machine component supported by the axial bearing.

The reference component can be a housing, such as a housing that contains the rotating machine component.

In addition or in the alternative, the hydraulic regulating device can include a hydraulic nut. In this case, the displaceable axial bearing can be re-positioned, e.g., by or in response to fluid pressure present inside the machine according to a typical operating principle of the hydraulic nut.

In addition or in the alternative, the adjusting device can be equipped or designed to displace the axial bearing in accordance with changes in an inner pressure (e.g., the above-noted fluid pressure) within the housing, in order to regulate or control the axial gap to a target value.

In another aspect of the present teachings, a roller bearing assembly rotatably supports a machine component in a housing. The machine component is connected with a shaft. A radial bearing radially guides or supports the shaft relative to the housing. A positionable (re-positionable or displaceable) axial bearing is designed to axially guide or support the shaft relative to the housing within a range of axial positions. A hydraulic regulating device adjusts an axial gap between the machine component and the housing by automated displacement of the positionable axial bearing.

In embodiments in which the roller bearing assembly includes a hydraulically-positionable axial bearing, the axial gap between a machine component and the reference component and/or housing can be adjusted more precisely. Thus, for example, rapidly-occurring interference fluctuations can be compensated during the operation of the roller bearing assembly. In addition or in the alternative, the axial gap can be adjusted more precisely by the hydraulic adjustment and the axial gap can be reduced to and maintained at a few microns during operation, if necessary, thereby improving the efficiency, e.g., of a rotary screw-type machine, such as a rotary screw compressor.

The adjusting device can be equipped or designed to adjust and/or reset the axial gap between the machine component and the reference component and/or the housing during the operation of the roller bearing assembly. More preferably, the axial gap is dynamically adjusted or reset during the operation of the roller bearing assembly. In this case, the axial gap can be reset, e.g., when an axial gap width change occurs during operation as a result of temperature changes. This dynamic adjustment has the advantage that, in any operating mode, a relatively small, if not minimal, axial gap can be set or maintained, without having to consider minimum installation gap dimensions, e.g., necessary for preventing contact after thermal expansion of the rotating machine component and/or the stationary housing. Therefore, in particularly preferred embodiments, a desired minimum gap can be always maintained both in a cold state and in a hot state of the roller bearing assembly by dynamically resetting the axial gap during the operation of the roller bearing assembly.

The hydraulic regulating device can include an evaluation device configured to determine the axial gap and/or to adjust or control the positionable axial bearing in accordance with a value determined by the evaluation device. In this case, the evaluation device is preferably designed to determine the instantaneous axial gap. Then, a processor or controller (e.g., the evaluation device) may compare the value of the instantaneous axial gap, which value is determined by the evaluation device, with a predetermined target value for the axial gap. An amount of deviation can be calculated in case the actual value of the instantaneous axial gap deviates from the target value. The calculated deviation amount may serve as a measure or amount for subsequent axial repositioning of the axial bearing so as to maintain the axial gap at or about the predetermined target value. The hydraulic regulating device can be designed to determine the instantaneous axial gap once, several times or continuously, e.g., with the help of the evaluation device, during the operation of the roller bearing assembly.

In preferred embodiments, the hydraulic regulating device can be designed to regulate the axial gap based on a value determined by the evaluation device. Operational influences on the axial gap can be compensated better by a hydraulic regulation of the axial gap during the operation of the roller bearing assembly. This enables length expansions of the machine components and/or of the housing caused by thermal factors to be compensated either continuously or in discrete time intervals.

In addition or in the alternative, the evaluation device may include at least one sensor configured to detect the amount of the axial gap either directly or indirectly.

Preferably, the sensor(s) measure(s) the axial gap width. The sensor can be, e.g., an electrical sensor, such as a clearance sensor operating in a contact-less manner.

When using a sensor, the hydraulic regulating device can be equipped or designed to regulate the instantaneous axial gap based on a measured or detected value determined by the sensor. For that purpose, the regulating device can include a regulator. In such an embodiment, the measured value of the sensor may represent an actual value that is compared with a stored and/or predetermined value in order to determine a deviation, which provides a measure or amount for adjusting the positionable axial bearing using the adjusting device (e.g., the hydraulic regulating device).

The sensor may optionally be designed to measure the axial clearance between the machine component and the reference component, e.g., the housing. The measurement range and thus the axial gap width may preferably be between about 5-500 microns. Thus, the axial gap can be reduced to a few microns by using appropriate sensors in accordance with the present teachings. In addition to a possible regulation during the operation of the hydraulically-positionable roller bearing assembly, the installation of the roller bearing assembly also can be simplified by utilizing sensors, in particular clearance sensors, because the axial gap amount need not be precisely set during assembly, due to the fact that the axial gap width can be dynamically adjusted during operation. One or more sensors can be disposed between a stationary housing and a rotating machine component for this purpose.

In a preferred embodiment, the sensor(s) can be disposed, e.g., on or in the reference component, e.g., on or in the housing, and can be designed to measure the axial clearance (width) between a reference surface of the machine component and the sensor. The sensor(s) can be affixed to the housing and/or can be integrated into the housing. The reference surface can be, e.g., a side of the machine component that faces the housing. In this respect, the side of the machine component that faces the housing and an inner wall of the housing limit or define the axial gap to be adjusted.

In a preferred embodiment, the machine component comprises a screw, e.g., of a rotary screw-type machine, such as a rotary screw compressor or a rotary screw pump. Especially in case of rotary screw-type machines, the size of the clearance between the screw and the housing can affect the sealing and thus the efficiency of the compressor machine.

Therefore, it is desirable to achieve a gap as small as possible, e.g., which is close to zero, but without risking the possibility of abrasion-causing contact between rotating and stationary machine components. Thus, in accordance with the present teachings, the axial position of the screw of rotary screw-type machine can be safely and reliably regulated, if desired, to a very minimal amount during operation in order to increase the efficiency of the rotary screw-type machine.

In another aspect of the teachings, tapered roller bearings, which can be operated at only significantly limited rotation speeds, can be omitted. In this case, the operating speed can be increased using the present roller bearing assemblies, in which an axial gap between a machine component and a housing can be automatically and/or dynamically adjusted.

Further objects, features and advantages of the present teachings will become apparent after reading the following description and claims in view of the appended drawings.

DETAILED DESCRIPTION OF THE INVENTION

Figure 1:
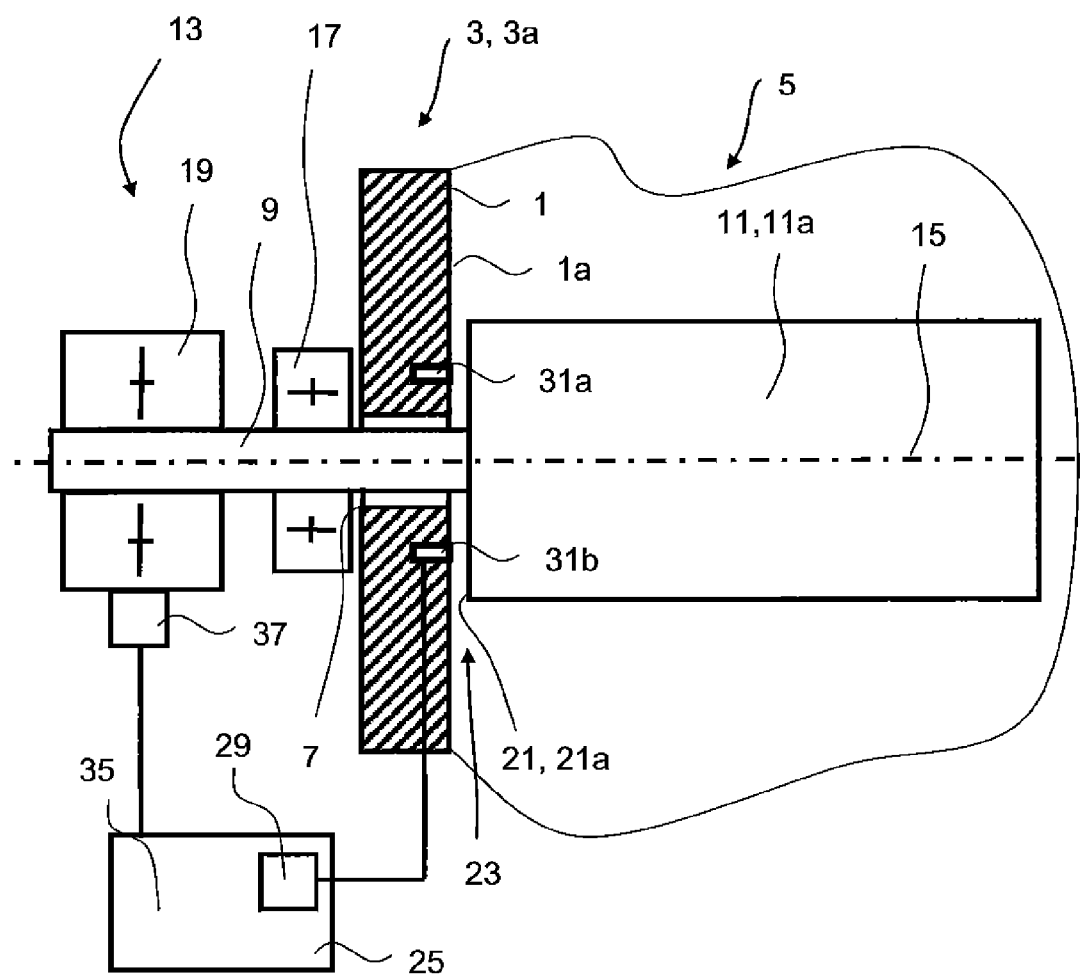
FIG. 1 shows a cross-section of a representative embodiment of a roller bearing assembly of a rotary screw-type machine having a radial bearing and an axially-displaceable axial bearing.

FIG. 1 depicts a wall segment 1 of a reference component 3 of a rotary screw-type machine 5. In this embodiment, the reference component 3 is a portion of a housing 3a. A shaft 9 passes through an opening 7 in the wall segment 1. A machine component 11 sits on or extends from the shaft 9 and is preferably a screw 11a of the rotary screw-type machine 5. The machine component 11 or screw 11a is supported by a roller bearing assembly 13 so as to be rotatable in the housing 3 about an axis 15.

The roller bearing assembly 13 includes a radial bearing 17 and an axial bearing 19. The radial bearing 17 guides or supports the shaft 9 in the radial directions relative to the axis 15. The axial bearing 19 guides or support the shaft 9 in the axial direction, i.e. in the direction of the longitudinal extension of the shaft 9 and the axis 15.

The screw 11a is connected with the shaft 9 so that they rotate together. A reference surface 21 and/or front side 21a of the screw 11a is oriented towards an inner side 1a of the wall segment 1 of the housing 3. An axial gap 23 is defined between the front side 21a of the screw 11a and the inner side 1a of the wall segment 1 of the housing 3.

In order to automatically adjust and/or set the axial gap 23 during operation, the axial bearing 19 is designed so as to be axially re-positionable or displaceable. For this purpose, the positionable axial bearing 19 is connected with or coupled to an adjusting device 25. The adjusting device 25 includes a hydraulic regulating device 37, which is configured to axially reposition or displace the axial bearing 19 (and thus the shaft 9 and screw 11a) in order to adjust the axial gap 23. The adjusting device 25 also preferably includes an evaluation device 29, e.g., one or more processors or microcontrollers. The evaluation device 29 is in communication with a first sensor 31a and, if provided, with one or more other sensors 31b.

The evaluation device 29 is designed to determine a value of (or corresponding to) the axial gap 23. Based on the value determined by the evaluation device 29, the hydraulic regulating device 37 is controlled by the adjusting device 25 to thereby adjust and/or displace the axial gap 23 to a target value. That is, in case the actual axial gap differs from a predetermined target axial gap, the hydraulic regulating device 37, e.g., a hydraulic nut, is controlled or actuated to return or reset the actual axial gap to the target axial gap.

The adjusting device 25 can include, e.g., a regulator or controller. The value of the axial gap 23 can be, e.g., a measured width of the axial gap 23. The axial gap 23 (i.e. the width thereof) can be determined or measured by at least one sensor 31a, 31b. The sensor(s) 31a, 31b can be designed to directly or indirectly measure the axial gap 23. The sensor(s) 31a, 31b can be designed, in particular, to measure the axial gap 23 between the reference surface 21 and/or the front side 21a of the screw 11a and the inner side 1a of the wall segment 1 of the housing 3. Both sensors 31a, 31b are integrated into the wall segment 1 of the housing 3 in the embodiment shown in FIG. 1.

Thus, if the evaluation device 29 determines the value or amount of the axial gap 23, the regulator 35 may be actuated based on the determined value, thereby adjusting and/or resetting the axial gap 23 to the target value.

The evaluation device 29 may serve as a controller and may comprise an analog circuit, a digital circuit (state machine) and/or a programmable logic circuit, such as one or more microprocessors. If implemented in software, the evaluation device 29 may execute an algorithm that comprises one or more steps of (i) receiving a signal representing the detected width of the axial gap 23 from at least one sensor 31a, 31b, (ii) determining a value of the detected width based upon the received signal, e.g., by using a first look-up table (LUT), (iii) calculating a deviation, if any, by subtracting the determined width from a predetermined target width, (iv) if a deviation exists, calculating a compensating value, e.g., by using a second look-up table (LUT) and (v) communicating the compensating value to the hydraulic regulating device 37 to thereby axially re-position or displace the axial bearing 19, and thus the shaft 9 and screw 11a, to return or reset the axial gap 23 to the predetermined target value.

Figure 2:
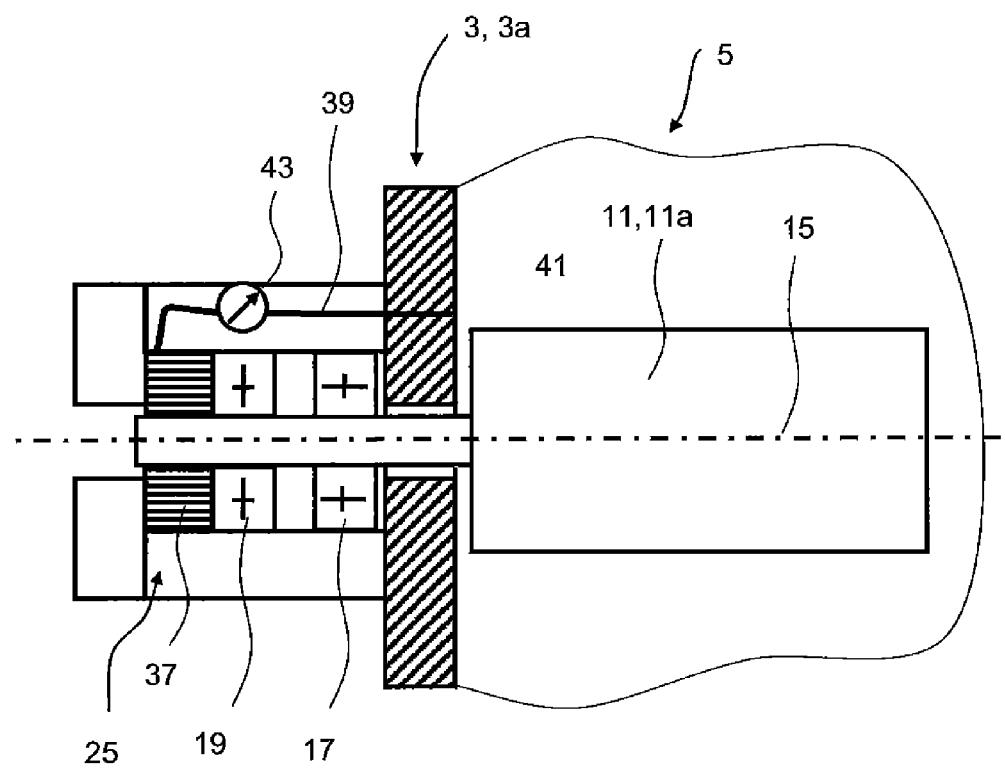
FIG. 2 shows a cross-section of a more detailed embodiment of the roller bearing assembly of FIG. 1 with hydraulic resetting of an axial gap using pressure regulation.

The arrangement of the hydraulic regulating device 37 is illustrated in more detail in the embodiment depicted in FIG. 2. The adjusting device 25 is formed by or at least includes the hydraulic regulating device 37, which preferably includes the hydraulic nut. The hydraulic regulating device 37 is in communication with an inner chamber 41 of the housing 3 via a pressure equalizing line 39. As depicted in FIG. 2, a pressure regulator 43 can be interconnected in the pressure equalizing line 39. The axial bearing 19, and thus the shaft 9 and screw 11a, are displaced in the axial direction relative to the housing 3 by the hydraulic regulating device 37 in accordance with the inner pressure communicated via the pressure equalizing line 39, thereby regulating the axial gap 23 to the target value, i.e. maintaining the width of the axial gap 23 at predetermined value or within a predetermined range. The axial bearing 19 is displaceable by the hydraulic regulating device 37 in response to the fluid pressure inside the rotary screw-type machine 5.

In all exemplary embodiments, a radial cylindrical roller bearing can be used as radial bearing 17. An axial tapered roller bearing can be used as axial bearing 19. More preferably, a radial cylindrical roller bearing serving as axial bearing 19 can be combined with an axial tapered roller bearing serving as axial bearing 19. In addition or in the alternative, the radial bearing 17 can be combined with the axial bearing 19 in one bearing unit that can be, e.g., flange-mounted on the rotary screw-type machine 5.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved roller bearing assemblies, rotary-screw machines and methods for manufacturing and operating the same.

Moreover, combinations of features and steps disclosed in the above detail description may not be necessary to practice the invention in the broadest sense, and are instead taught merely to particularly describe representative examples of the invention.

Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 1 wall segment
3 reference component
3a housing
5 rotary screw-type machine
7 opening
9 shaft
11 machine component
11a screw
13 roller bearing assembly
15 axis
17 radial bearing
19 axial bearing 21 reference surface
23 axial gap
25 adjusting device
29 evaluation device
31a, 31b sensors
35 regulator
37 hydraulic regulating device
39 pressure equalizing line
41 inner chamber
43 pressure regulator

The invention claimed is:

1. A roller bearing assembly configured to rotatably support a machine component, which is connected with a shaft, in a position relative to a reference component, comprising:
   a radial bearing,
   a housing containing at least a portion of the machine component in an interior of the housing,
   a positionable axial bearing configured to axially guide the shaft relative to the housing, axially support the shaft relative to the housing, or both, wherein the positionable axial bearing is positionable at a range of axial positions with respect to the housing,
   an adjusting device configured to set an axial gap between the machine component and the reference component by automated displacement of the positionable axial bearing and the shaft, the adjusting device including a hydraulic regulating device configured to axially displace the axial bearing and the shaft; and
   a pressure equalizing line extending between and communicating with the interior of the housing and the hydraulic regulating device.

2. A roller bearing assembly according to claim 1, wherein the hydraulic regulating device is configured to displace the axial bearing in accordance with an inner pressure within the housing in order to regulate the axial gap to a predetermined target distance.

3. A roller bearing assembly according to claim 1, wherein the hydraulic regulating device comprises a hydraulic nut.

4. A roller bearing assembly according to claim 1, wherein the hydraulic regulating device is configured to adjust the axial gap during operation of the roller bearing assembly.

5. A roller bearing assembly according to claim 1, wherein the reference component is a portion of the housing containing the machine component and the shaft passes through a wall of the housing.

6. A roller bearing assembly according to claim 1, further comprising an evaluation device configured to determine an amount of the axial gap and to dynamically control the axial displacement of the axial bearing in order to reset the axial gap to a predetermined target distance.

7. A roller bearing assembly according to claim 6, further comprising at least one sensor configured to detect the axial gap and being in communication with the evaluation device.

8. A roller bearing assembly according to claim 7, wherein the at least one sensor is configured to measure the axial gap between the machine component and the housing containing the machine component in a measurement range between about 5-500 microns.

9. A roller bearing assembly according to claim 7, wherein the at least one sensor is disposed in or on the housing and is designed to measure the axial gap between a reference surface of the machine component and the sensor.

10. A roller bearing assembly according to claim 9, wherein the machine component is a screw of a rotary screw-type machine.

11. A roller bearing assembly according to claim 10, wherein the reference component is a portion of the housing containing the machine component and the shaft passes through a wall of the housing.

12. A roller bearing assembly according to claim 1, further comprising an evaluation device configured to determine an amount of the axial gap and to dynamically control the axial displacement of the axial bearing in order to reset the axial gap to a predetermined target value during operation.

13. A roller bearing assembly according to claim 12, further comprising at least one sensor configured to detect the axial gap during operation.

14. A roller bearing assembly according to claim 13, wherein the at least one sensor is configured to measure the axial gap between the machine component and the reference component in a measurement range between about 5-500 microns.

15. A roller bearing assembly according to claim 13, wherein the at least one sensor is disposed in or on the housing and is designed to measure the axial gap between a reference surface of the machine component and the sensor.

16. A roller bearing assembly according to claim 1, wherein the machine component is a screw of a rotary screw-type machine.

17. A roller bearing assembly according to claim 1, wherein the axial gap is defined on one axial side by the machine component and on a second axial side by the reference component, wherein the reference component is stationary and the machine component is configured to rotate and compress a fluid, and wherein the shaft passes through the reference component.

18. An apparatus comprising:
   a machine component connected with a shaft, wherein the machine component rotates with the shaft and is configured to compress a fluid,
   a housing containing the machine component therein, the shaft passing through a wall of the housing,
   a radial bearing rotatably supporting the shaft in a radial direction,
   a positionable axial bearing rotatably supporting the shaft in an axial direction, the positionable axial bearing being configured to be positioned at a plurality of axial positions relative to the housing, and
   a hydraulic regulating device configured to displace the axial bearing and the shaft in the axial direction during operation of the apparatus in order to adjust an axial gap defined at least partially by the machine component and the wall of the housing, and
   a pressure equalizing line extending between and communicating with an interior of the housing and the hydraulic regulating device.

19. An apparatus according to claim 18, further comprising:
   at least one sensor positioned on at least one side of the axial gap and configured to detect a width of the axial gap during operation, and
   a controller configured to receive a signal from the at least one sensor indicative of the detected width of the axial gap, calculate a deviation between the detected width and a predetermined target axial gap width and control the hydraulic regulating device to displace the axial bearing and the shaft in the axial direction so as to maintain the axial gap at the predetermined target axial gap width.

20. An apparatus according to claim 18, wherein the hydraulic regulating device comprises a hydraulic nut, the axial and radial bearings are mounted exterior of the housing and a pressure equalization line communicates an instantaneous pressure within the housing to one of a controller and the hydraulic regulating device so as to adjust the axial gap in accordance with the instantaneous pressure within the housing.

21. A rotary screw machine comprising:
a screw connected with a shaft, wherein the screw is rotatable and configured to compress a fluid,
a housing defining an interior containing the screw therein, the shaft passing through an inner wall of the housing,
a radial bearing rotatably supporting the shaft in a radial direction,
an axial bearing rotatably supporting the shaft in an axial direction, and
a hydraulic regulating device comprising a hydraulic nut configured to displace the axial bearing and the shaft in the axial direction during operation of the rotary screw machine in order to dynamically adjust an axial gap at least partially defined by the inner wall of the housing and a side of the screw facing the inner wall of the housing, and
a pressure equalizing line extending between and communicating with the interior of the housing and the hydraulic regulating device.

* * * * *